United States Patent Office 3,442,850
Patented May 6, 1969

3,442,850
OXYMETHYLENE POLYMER COMPOSITIONS CONTAINING CARBON BLACK
Merrill N. O'Brien, Jr., New Providence, and Frank M. Berardinelli, South Orange, N.J., assignors to Celanese Corporation, New York, N.Y., a corporation of Delaware
No Drawing. Filed June 30, 1966, Ser. No. 561,733
Int. Cl. C08g *51/08, 51/60, 37/02*
U.S. Cl. 260—37
13 Claims

ABSTRACT OF THE DISCLOSURE

The resistance of stabilized oxymethylene polymers to the degrative effects of outdoor weathering and exposure to ultra-violet radiation is improved by the addition of carbon black to the polymer. This addition of carbon black adversely affects the thermal stability of the polymer. The incorporation of an aromatic amine antioxidant containing a plurality of aromatic rings reduces these adverse incorporation of the carbon black.

---

This invention relates to the stabilization of oxymethylene polymers containing carbon black.

Polyoxymethylene of high molecular weight is a very strong, tough material that, however, tends to degrade, producing formaldehyde by its decomposition, on heating at elevated temperatures such as 230° C. This material can be stabilized to some extent by the addition of small amounts of phenols or aromatic amines, as illustrated for example in U.S. Patent 2,920,059. The inherent resistance of the polymeric material to degradation on heating can be improved by chemical modification, particularly by copolymerization as illustrated in U.S. Patent 3,027,352, to form oxymethylene copolymers containing minor proportions of interspersed oxyethylene radicals or other radicals resistant to the "unzipping" characteristic of polyoxymethylene; copolymers of this type are also described by Kern et al. in Angewandte Chemie, 73(6), pp. 177–186, (Mar. 21, 1961). Another chemical modification of the polymeric material is end-capping to convert relatively unstable terminal —OCH₂OH groups of the polymer to more stable groups, e.g. acetate or methoxy groups; this is also described in the Kern et al. article previously mentioned.

The resistance of stabilized oxymethylene polymers to the degradative effects of outdoor weathering, and especially to exposure to ultra-violet radiation, is not as high as desired. To improve the weathering resistance, carbon black has been added to the polymer, but the inclusion of the carbon black (and especially of the more effective acidic carbon blacks) has adversely affected the thermal stability of the product. This defect may be overcome in part by addition of quantities of acid acceptors (such as cyanoguanidine), as discussed, for example, in French Patent 1,377,596 (corresponding to South African Patent 63/4507).

In accordance with one aspect of this invention, it has been found that the thermal stability of oxymethylene polymers containing carbon black may be greatly improved by the incorporation of an aromatic amine antioxidant containing a plurality of aromatic rings and in which each nitrogen atom is directly attached to at least one aromatic ring; preferably the amine contains at least one nitrogen atom having two valences directly attached to different aromatic rings.

Examples of aromatic amine antioxidants are diphenyl p-phenylenediamine (a particularly preferred material, which has two secondary arylamino groups); diarylamine-acetone condensation products such as those disclosed in U.S. Patents 1,807,735 and 2,002,642 (which likewise appear to contain a plurality of secondary arylamino groups); condensation products of aldol and arylamines such as aldol-alpha-napthylamine; and dioctyl diphenylamine (a condensation product of diisobutylene and diphenylamine). Compounds such as diphenylguanidine are not within the class of compounds in which each nitrogen is attached to an aromatic ring; the former compounds do not act like the latter, but may be present in addition to the latter.

The amount of aromatic amine antioxidant which is present is preferably less than 5% and still more preferably less than 2%, a proportion in the range of about 1/10 to 1% being most preferred. Although the presence of the aromatic amine antioxidant generally causes discoloration of a carbon-black free oxymethylene polymer, such discoloration is not noticeable, and is without adverse effect, in the black compositions of this invention.

For greatest stability, there should also be present a scission inhibitor for the oxymethylene polymer. The preferred scission inhibitors are amidines, particularly cyanoguanidine, and carboxylic polyamides, particularly thermoplastic linear polyamides, such as nylons having molecular weights above 1000 and melting in the range of about 150–200° C. (e.g. an interpolymer of caprolactam, a diamine and a dicarboxylic acid, such as a nylon 6,6/nylon 6,10/nylon 6 terpolyamide, made from caprolactam, hexamethylene diamine, adipic acid and sebacic acid, and containing for example, 38% of

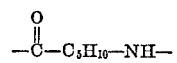

units, 31% of —HNC₆H₁₂NH— units, 17½% of —OCC₄H₈CO— units, and 13½% of —OCC₈H₁₆CO— units, and having a melting point of about 150–160° C.). The scission inhibitors are generally present in small amounts, less than 5%, preferably less than 2% and most preferably in the range of about 1/10 to 1%. Other scission inhibitors are disclosed in the previously mentioned French Patent 1,377,596. The commercially available natural-colored unpigmented oxymethylene polymer flakes or molding powders generally contain the scission inhibitor together with a phenolic antioxidant, usually an alkylene bis-phenol having a nuclear alkyl substituent. It is convenient to add the carbon black and the previously described aromatic amine antioxidant to such pre-stabilized, substantially non-discoloring, compositions; thus, the black and aromatic amine may be added only to that portion of the output of the stabilized polymer manufacturing plant that is intended for use in weather-resistant compositions. The prestabilized compositions generally have a $K_D$ value (as defined in Example 1 below) of less than 0.04%, e.g. in the range of 0.01–0.03% prior to the addition of the carbon black and aromatic amine antioxidant. In the most preferred form, the $K_D$ value of the final product containing the carbon black is less than 0.05%; as will be seen from the following Examples 1 and 3, such values are attained even though, in the absence of the aromatic amine antioxidant, the $K_D$ value of the carbon-containing product is well above 0.05%, e.g. well over twice that value as illustrated by the $K_D$ of 0.74% in Example 1.

The carbon black and the aromatic amine may, if desired, be pre-mixed before adding them to the polymer, e.g. by preparing a slurry of the two materials in water or a slurry of the carbon black in an organic solvent solution of the aromatic amine; the resulting fluid mixture may be added to finely divided polymer, the liquid may be evaporated off, and the blend may be thoroughly mixed, as by milling.

The carbon black may be any of those described in the French patent mentioned above. As previously indicated, the acidic blacks such as channel blacks having average particle sizes in the range of about 5 to 30 millimicrons are particularly effective. Basic blacks, such as furnace blacks whose average particle size is about 20 to 30 microns may be employed. Less desirably, but still within the broader scope of the present invention, the carbon black may have an average diameter up to 75 millimicrons. An example of an alkaline furnace black is "Statex B." The particle sizes are arithmetic mean diameters measured from electron micrographs. The proportion of carbon black is preferably in the range of about 1/10 to 5%, more preferably in the range of about 0.3–3%.

The invention finds particular utility in the stabilization of oxymethylene-oxyalkylene copolymers (and particularly oxymethylene-oxyethylene copolymers) such as disclosed in Walling et al., U.S. Patent 3,027,352, including terpolymers with minor amounts of polyfunctional compounds such as disclosed in French Patent 1,345,218 (South African Patent 62/47,71). The copolymer may be pretreated as described in U.S. Patent 3,219,623 to remove less stable terminal oxymethylene groups, or a copolymer containing such less stable groups may be made more stable by milling or otherwise mechanically working it with the amidien and diphenylamine-acetone condensation product at a relatively high temperature (preferably above the melting point of the polymer, e.g. in the range of about 180° to 220° C.). It is within the broader scope of this invention to employ other oxymethylene copolymers having at least 60% (and preferably at least 95%) oxymethylene groups and containing other interspersed —O—R— units, where R is a divalent radical containing at least two carbon atoms directly linked to each other and positioned in the chain between the two valences, the substituents, if any, on said R radical being preferably inert. Various types of —O—R— units have been described in the art, including those in the previously mentioned Kern et al. article, —O—R— units derived from monomers having carbon-to-carbon unsaturation (e.g. acrylamide), and —O—R— units in which the R is a source of chain branching. It is also within the broader scope of this invention to employ oxymethylene polymer resins, having acetate, methoxy, or other end caps (e.g. urethane end caps or other ester or ether end caps). Preferably, the oxymethylene polymer has a melting point of at least 150° C. and is normally millable at a temperature of 200° C. Its inherent viscosity (measured at 60° C. in a 0.1% solution in a p-chlorophenol containing 2% α-pinene) is preferably at least one. Some types of the oxymethylene polymers, such as the oxyethylene copolymers described above, are resistant to alkalene hydrolysis (e.g. resistant to exposure to 50% aqueous NaOH solution under reflux at 140–145° C. for one hour).

The following examples are given to illustrate this invention further:

EXAMPLE 1

A commercial stabilized oxymethylene homopolymer end-capped with acetate end groups and containing minor amounts of a nylon polymer and a phenolic antioxidant as stabilizers (Delrin 550), was mixed with 1.6% of channel carbon black (Monarch 74, composed of spherical particles having an average particle size of 17 millimicrons) and with 0.5% of diphenyl p-phenylenediamine. The mixture was worked on a "Plastograph" at 190° C. for 10 minutes in a nitrogen atmosphere. (A Plastograph is a device in which the mechanical working is effected in a heated chamber with counter-rotating roller blade mixers.) The resulting blend was compression-molded at 190° C. to form 5 gram disks about 2 inches in diameter, which were then tested for thermal stability by maintaining them at a temperature of 230° C. in air (in a recess in a constant temperature block having a lid permitted restricted access of the outside atmosphere) and measuring the weight lost by the specimens, after 45 minutes.

By dividing the percent weight loss by the 45 minute time, a degradation rate $K_D$ (percent/min.) is obtained.

For the commercial stabilized end-capped homopolymer, without the carbon or aromatic amine, $K_D$ was about 0.022%. For a composition containing the stabilized homopolymers and the 1.6% of channel carbon black the $K_D$ was 0.74%. Incorporation of the 1/2% of diphenyl p-phenylenediamine into the black-containing stabilized homopolymer gave a blend having a $K_D$ of 0.037%, a twenty-fold reduction in degradation rate.

When furnace black ("Statex B") was substituted for the channel black, without the aromatic amine, the degradation rate $K_D$ was not affected so drastically, rising to less than 0.1%. Incorporation of the 1/2% of diphenyl p-phenylenediamine with this carbon gave a blend whose $K_D$ was 0.053%. Thus, surprisingly, the combination containing channel carbon and diphenyl p-phenylenediamine was superior in thermal stability to the combination containing furnace carbon and that aromatic amine.

EXAMPLE 2

A random copolymer of trioxane and ethylene oxide prepared with a boron trifluoride catalyst and containing about 2% of interspersed oxyethylene groups was treated to remove unstable oxymethylene groups at the ends of the polymer chains, as in U.S. Patent 3,219,623, and was mixed with 1.6% of the channel carbon black of Example 1, and 1/2% of diphenyl p-phenylenediamine. The mixture was worked and tested as in Example 1. The $K_D$ for the copolymer, without the added carbon black and aromatic amine, was 0.48%. For the copolymer containing 1.6% of channel black, $K_D$ was 1.9%. For the above described blend containing the copolymer, the channel black and the aromatic amine, $K_D$ was 0.09%.

EXAMPLE 3

In this example a stabilizer-containing copolymer was employed as the base material. A random copolymer of trioxane and ethylene oxide prepared with a boron trifluoride catalyst and containing about 2% of interspersed oxyethylene groups was treated to remove unstable oxymethylene groups at the ends of the polymer chains, as disclosed in U.S. Patent 3,219,623, and was thoroughly blended with 0.1% cyanoguanidine and 0.5% 2,2'-methylene-bis-(4-methyl-6- tertiary butyl phenol), a phenolic antioxidant. This stabilized mixture was then blended with 1.6% of the channel carbon black of Example 1 and 1/2% of diphenyl p-phenylenediamine, and worked and tested as in Example 1. The $K_D$ of the product was 0.025%. Similar results were obtained when "Aminox" (a solid, fusible diphenylamine-acetone reaction product, which is a light tan-green powder having a melting range of 85–95° C. (Ball and Ring Test), a specific gravity of 1.15, soluble in acetone and ethylene dichloride, slightly soluble in benzol and insoluble in water and gasoline) was substituted for the diphenyl p-phenylenediamine.

The compositions of this invention are useful for the production of shaped articles, e.g. by injection molding, compression-molding, blow-molding, extrusion, melt-spinning into filaments, etc., and are particularly useful for the manufacture of articles requiring a long weather-resistant life.

It is to be understood that the foregoing detailed description is given merely by way of illustration and that many variations may be made therein without departing from the spirit of the invention.

What is claimed is:

1. In an oxymethylene polymer composition comprising an oxymethylene polymer resin containing at least 60% oxymethylene groups and carbon black, said carbon black being present in an amount sufficient to increase the ultra-violet resistance of said composition, the improvement which comprises:

the admixture of an aromatic amine antioxidant containing a plurality of aromatic rings, said amine being selected from the group consisting of diphenyl p-phenylenediamine, diarylamine-acetone condensation products, aldol and arylamine condensation products and dioctyl diphenylamine, said amine being present in an amount sufficient to reduce the adverse effects on the thermal stability resulting from the incorporation of said carbon black.

2. A composition as in claim 1 in which the oxymethylene polymer resin contains at least 95% oxymethylene groups and the carbon black has an average particle diameter of at most 30 millimicrons.

3. A composition as in claim 2 in which the carbon black is an acidic black.

4. A composition as in claim 2 in which said oxymethylene polymer composition is one having, in the absence of said carbon black and aromatic amine, a thermal degradation rate ($K_D$) at 230° C. of less than 0.04% per minute.

5. A composition as in claim 3 in which the composition contains a fusible linear polyamide as a scission inhibitor.

6. A composition as in claim 5 in which the polyamide is a thermoplastic nylon resin having a melting point of about 150–200° C.

7. A composition as in claim 3 in which the composition contains an amidine as a scission inhibitor.

8. A composition as in claim 3 in which the amidine comprises cyanoguanidine.

9. A composition as in claim 2 in which the aromatic amine antioxidant is diphenyl phenylene diamine.

10. A composition as in claim 2 in which the aromatic amine antioxidant is diphenylamine-acetone condensation product.

11. A composition as in claim 6 in which the oxymethylene polymer is an end-capped homopolymer.

12. A composition as in claim 8 in which the oxymethylene polymer is an oxymethylene-oxyethylene copolymer.

13. A composition as in claim 3 in which the proportion of said aromatic amine antioxidant is in the range of about 1/10–1% and the proportion of carbon black is in the range of about 0.3–3%, based on the weight of the polymer.

References Cited

UNITED STATES PATENTS

| | | |
|---|---|---|
| 3,020,264 | 2/1962 | Behrends et al. _____ 260—37 |
| 3,102,106 | 8/1963 | Regan. |
| 3,210,322 | 10/1965 | Polly et al. |
| 3,222,316 | 12/1965 | Perry. |
| 3,261,805 | 7/1966 | Griffiths et al. |
| 3,262,908 | 7/1966 | Behrends. |
| 3,314,918 | 4/1967 | Berardinelli et al. |

FOREIGN PATENTS 1,152,541  8/1963  Germany.

MORRIS LIEBMAN, *Primary Examiner.*

L. T. JACOBS, *Assistant Examiner.*

U.S. Cl. X.R.

260—45.9